(12) United States Patent
Shankaranarayana et al.

(10) Patent No.: US 8,648,870 B1
(45) Date of Patent: Feb. 11, 2014

(54) METHOD AND APPARATUS FOR PERFORMING FRAME BUFFER RENDERING OF RICH INTERNET CONTENT ON DISPLAY DEVICES

(75) Inventors: Sudhir Tubegere Shankaranarayana, Bangalore (IN); Vijaya Senthil Veeri Chetty, Salem (IN); Jeetu Narayan, Bangalore (IN)

(73) Assignee: Adobe Systems Incorporated, San Jose, CA (US)

( * ) Notice: Subject to any disclaimer, the term of this patent is extended or adjusted under 35 U.S.C. 154(b) by 426 days.

(21) Appl. No.: 12/848,773

(22) Filed: Aug. 2, 2010

(51) Int. Cl.
*G09G 5/39* (2006.01)

(52) U.S. Cl.
USPC ............ 345/531; 345/530; 345/545; 715/700

(58) Field of Classification Search
USPC ......................................... 345/531, 545, 530
See application file for complete search history.

(56) References Cited

U.S. PATENT DOCUMENTS

| | | | | |
|---|---|---|---|---|
| 7,679,637 B1* | 3/2010 | Kohler | ....................... | 348/14.01 |
| 7,898,542 B1* | 3/2011 | Yu et al. | ......................... | 345/473 |
| 2005/0030316 A1* | 2/2005 | Sirtori et al. | .................. | 345/606 |
| 2006/0017735 A1* | 1/2006 | Rabb, III | ........................ | 345/473 |
| 2009/0189912 A1* | 7/2009 | Holtman | ....................... | 345/606 |
| 2009/0268823 A1* | 10/2009 | Dane et al. | ............... | 375/240.27 |

* cited by examiner

*Primary Examiner* — Ke Xiao
*Assistant Examiner* — Kim-Thanh T Tran
(74) *Attorney, Agent, or Firm* — Moser Taboada

(57) ABSTRACT

A method and apparatus for performing frame buffer rendering of rich Internet content on a display device is disclosed. In one embodiment, a method of performing frame buffer rendering of rich Internet content on a display device is disclosed. The method comprises storing content in a frame buffer according to a frame update rate, wherein the frame buffer comprises a portion of the rich Internet content, determining a consumption rate for presenting the content of the frame buffer on the display device, and adjusting the frame update rate according to the determined consumption rate.

15 Claims, 6 Drawing Sheets

METHOD AND APPARATUS FOR PERFORMING FRAME BUFFER RENDERING OF RICH INTERNET CONTENT ON DISPLAY DEVICES

BACKGROUND

1. Technical Field

Embodiments of the present invention generally relate to multimedia content management techniques and, more particularly, to a method and apparatus for performing frame buffer rendering of rich Internet content.

2. Description of the Related Art

The rapid proliferation of multimedia content (i.e., user interactive controls and application generated controls that create an exciting and interesting multimedia experience) throughout the Internet was caused by numerous technological innovations. Users spend a significant amount of time conducting various activities (e.g., surfing educational websites, viewing detailed product demonstrations, accessing digital libraries and participating in expert discussion forums related to the multimedia content). These users often download and view multimedia content on various display devices (e.g., a mobile phone, an electronic book reader, a Personal Digital Assistant (PDA), a hand-held gaming device and/or the like from various Internet resources (e.g., web pages, multimedia clips and/or content, emails and/or the like).

Rich Internet Applications (RIAs) provide interactive functionality for the multimedia content. Consequently, RIAs have become a very popular multimedia presentation tool on websites throughout the Internet. An RIA typically is a collection of multimedia content that is wrapped within programming code to be executed by a playback routine. For example, some RIAs may comprise animations, interfaces, games, video clips, audio clips, and/or other interactive or passive content (referred to herein as "rich Internet content"). In addition, an RIA typically includes program code to instruct a playback routine (referred to as an "RIA Player") how to display and progress through the content of the RIA. One such RIA Player is a FLASH® player (FLASH is a registered trademark of Adobe Systems Incorporated) that executes an RIA in the form of a SWF file to present rich Internet content to a viewer. The SWF file format is defined in by the SWF File Format specification (version 10) as published, at http:www.adobe.com/devnet/swf/pdf/swf_file_format_spec_v10.pdf, by Adobe Systems Incorporated of San Jose, Calif. Varieties of RIA players include frame-based players.

Generally, rich Internet content, which is authored at a high frame per second rate, is seamlessly rendered and/or displayed on desktops, laptops and/or the like. Considerable computing capabilities at these devices facilitate the rendering of the rich Internet content. However, rendering the rich Internet content at such as a high frame per second rate is not suitable for playback on certain display devices due to limited computing resources (i.e. processing cycles and memory space) and a smaller screen. Furthermore, these display devices suffer excessive processor utilization resulting in higher battery consumption while playing such rich multimedia content.

Conventional techniques are available for displaying the rich Internet content at a high frame per second rate on display devices. However, such techniques merely reduce the speed of the frames, which increases the playing time. Such techniques also skip frames in order to retain the original playing time while reducing processing requirements. The conventional techniques tend to consume a significant amount of computer resources and therefore, are cumbersome and costly for practical utility.

Therefore, there is a need in the art for a method and apparatus to improve rich Internet content processing by performing frame buffer rendering of rich Internet content in display devices.

SUMMARY

Various embodiments of the present disclosure generally includes a method and apparatus for performing frame buffer rendering of rich Internet content in display devices. In one embodiment, a method of performing frame buffer rendering of rich Internet content on a display device, comprises storing content in a frame buffer according to a frame update rate, wherein the frame buffer comprises a portion of the rich Internet content, determining a consumption rate for presenting the content of the frame buffer on the display device, and adjusting the frame update rate according to the determined consumption rate.

Figure 1:
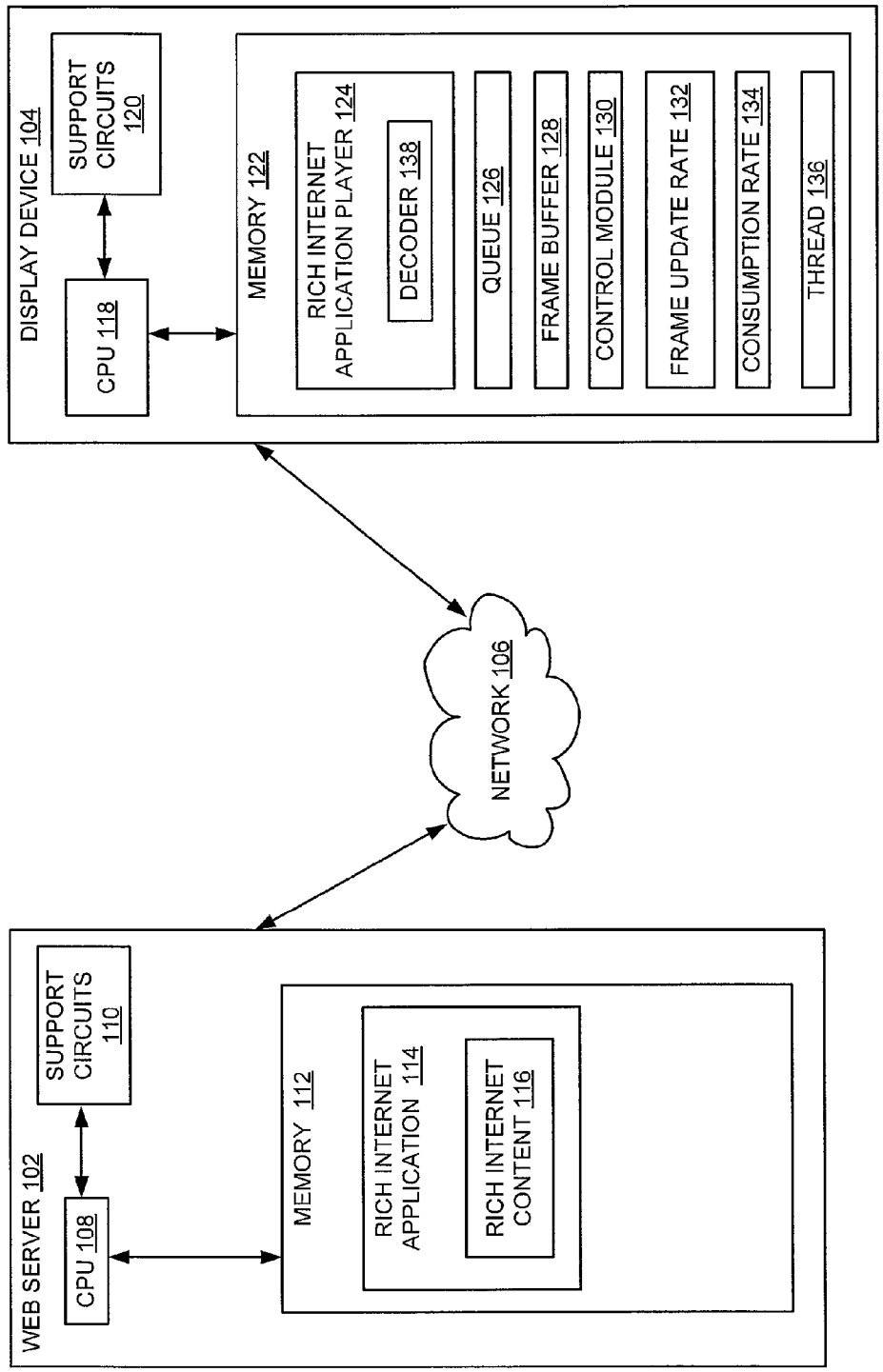
FIG. 1 is a block diagram of a system for performing frame buffer rendering of rich Internet content on display devices, according to one or more embodiments.

While the system and method for frame buffer rendering of rich Internet content on display devices is described herein by way of example for several embodiments and illustrative drawings, those skilled in the art will recognize that the system and method for frame buffer rendering of rich Internet content on display devices is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the system and method for partial encryption of frame-based electronic content as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for performing frame buffer rendering of rich Internet content on display devices are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a computing system 100 for performing frame buffer rendering of rich Internet content on display devices, according to one or more embodiments. The computing system 100 includes a web server 102 and a display device 104 where each is coupled to one another through a network 106.

The web server 102 is a type of computing device (e.g., a laptop, a desktop, a Personal Digital Assistant (PDA) and/or the like) known to one of ordinary skill in the art having the benefit of this disclosure. The web server 102 generally provides various Internet-based applications and services. The web server 102 comprises a CPU 108, support circuits 110, and memory 112. The CPU 108 may comprise one or more commercially available microprocessors or microcontrollers that facilitate data processing and storage. Various support circuits 110 facilitate operation of the CPU 108 and may include clock circuits, buses, power supplies, input/output circuits, a digital screen and/or the like. The memory 112 includes a Read Only Memory, Random Access Memory, disk drive storage, optical storage, removable storage, and the like. The memory 112 includes a rich Internet application 114 and rich Internet content 116. The web server 102 communicates the rich Internet content 116 to various devices, such as the display device 104, across the network 106.

The display device 104 is a type of a computing device (e.g., a notebook, a digital pad, a mobile phone, a Personal Digital Assistant (PDA), a hand-held gaming device, and/or the like) known to one of ordinary skill in the art having the benefit of this disclosure. Users employ the display device 104 to access various Internet resources (e.g., web pages, multimedia files (e.g., dynamic or static content in the form of images, video and/or audio), online services (e.g., social networking), applications, databases and/or the like). The rich Internet content 116 (i.e., flash (SWF) videos) from such Internet resources are efficiently rendered and/or presented on the display device 104 as described in the present disclosure.

The display device 104 comprises a CPU 118, support circuits 120, and memory 122. The CPU 118 may comprise one or more commercially available microprocessors or microcontrollers that facilitate data processing and storage. Various support circuits 120 facilitate operation of the CPU 118 and may include clock circuits, buses, power supplies, input/output circuits and/or the like. The memory 122 includes a Read Only Memory, Random Access Memory, disk drive storage, optical storage, removable storage, and the like. The memory 122 includes various software packages, such as a rich Internet application player 124 and a control module 130, and stores various data, such as a queue 126, a frame buffer 128, a frame update rate 132, a consumption rate 134, and a thread 136. The thread 136 (i.e., a thread of execution) refers to a computing task for a computer process, which maintains software code and current data values for the execution of the control module 130 and/or the rich Internet application player 124.

The queue 126 includes the rich Internet content 116 partitioned into a plurality of video frames. As explained further below, each video frame is used to update the content of the frame buffer 128. Typically, the plurality of video frames are to be decoded prior to this update. In some embodiments, the queue 126 includes FLASH video, which may be embedded in a SWF file that is decoded into the plurality of video frames, such as key frames and delta frames.

In some embodiments, the rich Internet application player 124 includes software code (e.g., processor executable instructions) that is configured to render the rich Internet content 116 onto the display device 104. The rich Internet application player 124 further includes a decoder 138. The decoder 138 generally includes a audio/visual data decoder for displaying video frames in various formats (e.g., FLASH video, MPEG, h.263, h.264 and/or the like).

The network 106 comprises a communication system that connects computers by wire, cable, fiber optic and/or wireless link facilitated by various types of well-known network elements, such as hubs, switches, routers, and the like. The network 106 may employ various well-known protocols to communicate information amongst the network resources. For example, the network 106 may be a part of the Internet or Intranet using various communications infrastructure, such as Ethernet, WiFi, WiMax, General Packet Radio Service (GPRS), and the like.

In some embodiments, the control module 130 includes software code (e.g., processor executable instructions) for adjusting a frame update rate 132 according to a consumption rate 134 associated with presenting content (e.g., video frames) of the frame buffer 128 on the display device 104. The frame update rate 132 refers to a rate at which the content of the frame buffer 128 is updated with one or more video frames. The consumption rate 134 is generally defined as a rate at which the frame buffer 128 is rendered and displayed on a digital screen. For example, by determining a time (in seconds) for displaying a video frame on the digital screen, the control module 130 computes a number of video frames displayed per second. If the display device 104 takes 0.2 seconds to display the content of the frame buffer 128 on the screen, the consumption rate is computed as 1 sec/0.2 sec=five (5) frames per second (FPS).

In some embodiments, the frame update rate 132 exceeds the consumption rate. As such, the control module 130 selects a lower value between the consumption rate 134 and the frame update rate 132 and then, adjusts the frame update rate 132 to be equal to the consumption rate 134. For example, if the Internet content is authored at 50 frames per second and the consumption rate is 5 frames per second, the control module 130 reduces the frame update rate by reducing a rate at which the queue 126 is accessed as explained further below. Because updating the frame buffer 128 at fifty (50) frames per second requires fifty accesses of the queue 126 per second, the control module 130 reduces a number of accesses per second to five, according to some embodiments. Such a reduction ultimately results in the adjustment of the frame update 132 to five (5) frames per second.

Figure 2:
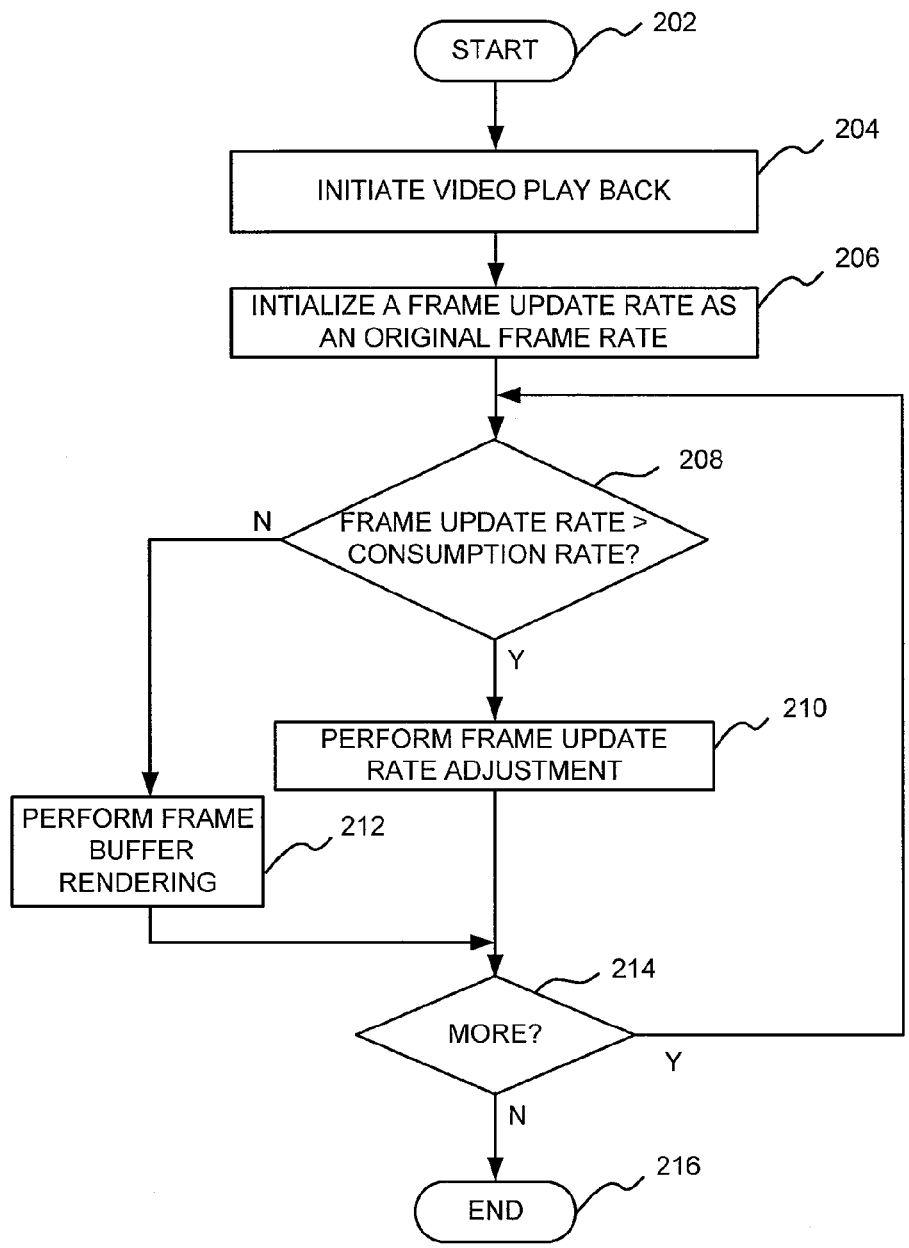
FIG. 2 illustrates a flow diagram of a method for performing frame buffer rendering, according to one or more embodiments.

FIG. 2 illustrates a flow diagram of a method 200 for performing frame buffer rendering, according to one or more embodiments. The method 200 starts at step 202 and proceeds to step 204, at which video play back is initiated on rich Internet content. In one embodiment, a user of a display device (e.g., the display device 104 of FIG. 1) initiates a video playback using a rich Internet application player (e.g., the rich Internet application player 124 of FIG. 1). At step 206, the method 200 initializes a frame update rate as an original frame rate of the rich Internet content as authored.

At step 208, the method 200 determines whether a frame update rate is greater than a consumption rate. If it is determined that the frame update rate is greater than the consumption rate (option "YES"), the method 200 proceeds to step 210, at which the method 200 performs frame update rate adjustment and then proceeds to step 214. In some embodiments, the frame update rate is adjusted by reducing a rate at which a queue (e.g., the queue 126 of FIG. 1) comprising the rich Internet content (i.e., as a plurality of video frames) is accessed for updating the contents of the frame buffer. Exemplary embodiments for performing the queue access rate reduction are explained in the description below with reference to FIG. 4.

If, at step 208, it is determined that the frame update rate is not greater than the consumption rate (option "NO"), the method 200 proceeds to step 212, at which frame buffer rendering is performed. In some embodiments, the rich Internet application player renders one or more video frames within the frame buffer (e.g., the frame buffer 128 of FIG. 1), which are presented on a digital screen. The method 200 then proceeds to step 214.

At step 214, a determination is made whether there are more frames in the queue. In some embodiments, a control module (e.g., the control module 130 of FIG. 1) determines whether there are more frames in the queue (e.g., the queue 126 of FIG. 1). If it is determined that there are more frames in the queue (option "YES"), the method 200 proceeds to step 208. If it is determined that there are no more frames in the queue (option "NO"), the method 200 proceeds to step 216, at which the method 200 ends.

Figure 3:
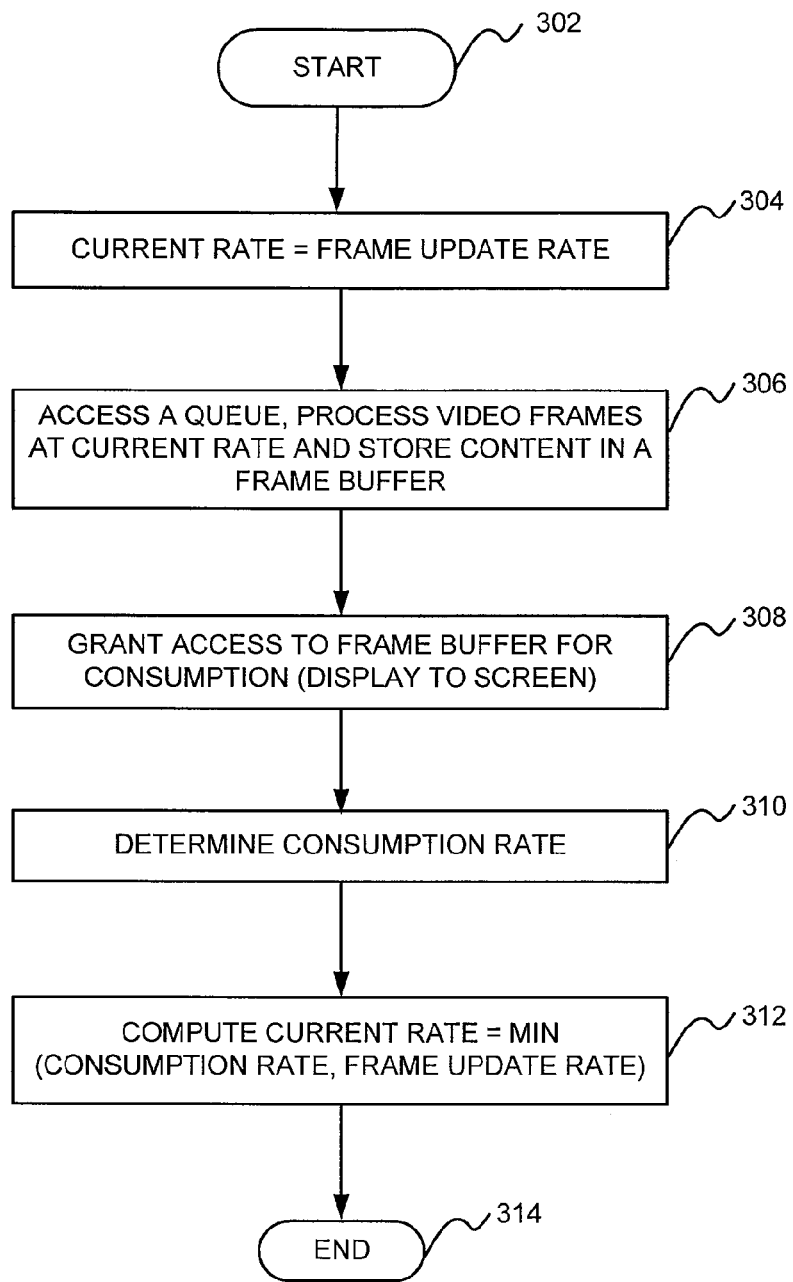
FIG. 3 illustrates a flow diagram of a method for adjusting a frame update rate, according to one or more embodiments.

FIG. 3 illustrates a flow diagram of a method 300 for adjusting a frame update rate, according to one or more embodiments. The method 300 starts at step 302 and proceeds to step 304, at which the method 300 sets a current rate equal to a frame update rate. In some embodiments, the current rate is an original frame rate as authored by the rich Internet content creators. In other embodiments, the current rate is a previous frame update rate. At step 306, the method 300 processes one or more video frames at the current rate and stores content for a frame buffer. In some embodiments, the video frames form a portion of rich Internet content (e.g., the rich Internet content 116 of FIG. 1).

At step 308, the method 300 grants access to the frame buffer for consumption of the content. In some embodiments, a rich Internet application player (e.g., the rich Internet application player 124 of FIG. 1) accesses and renders the video frames from within the frame buffer (e.g., the frame buffer 128 of FIG. 1). Then, the rich Internet application player presents the video frames on the display device (i.e., the display device 104 of FIG. 1) by. At step 310, the method 300 determines a consumption rate associated with presenting the frame buffer contents on the display device. The consumption rate is computed by determining a time (in seconds) that is necessary to display one frame on a digital screen of the display device. Based on this measurement, a number of frames that are displayed per second is computed. If the display device, for example, takes 0.2 seconds to present the frame, the consumption rate is computed as 1 sec/0.2 sec/frame=5 frames per second (FPS).

At step 312, the method 300 computes the current frame update rate. In some embodiments, the current frame update rate is calculated by selecting a lower value between the consumption rate and the frame update rate. The method 300 proceeds to step 314, at which the method 300 ends.

Figure 4:
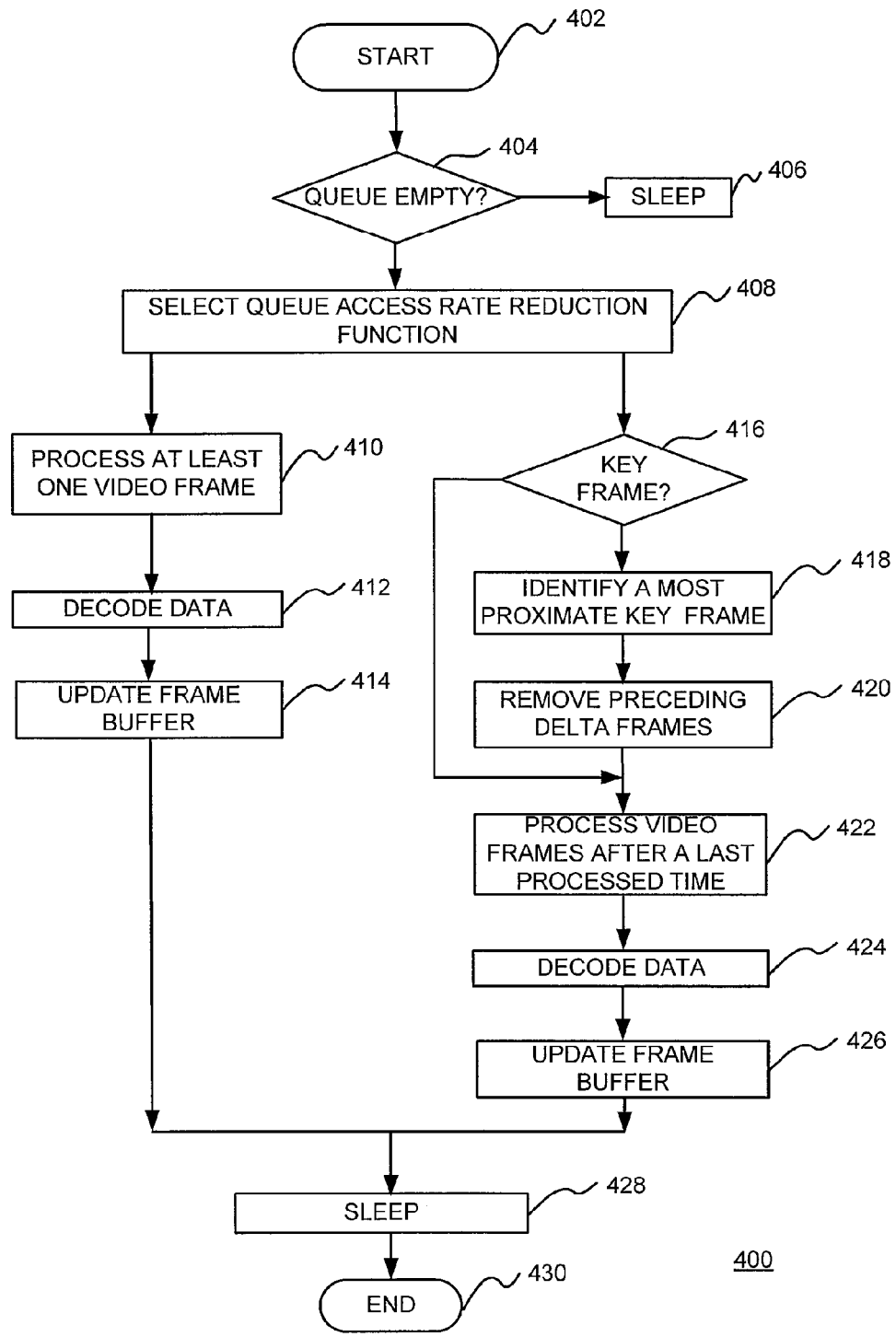
FIG. 4 illustrates a flow diagram of a method for processing a frame buffer according to a current frame update rate, according to one or more embodiments.

FIG. 4 illustrates a flow diagram of a method 400 for processing video frames according to a current frame update rate according to one or more embodiments. FIG. 4 may represent an exemplary embodiment of the step 306 of FIG. 3, at which content is stored in a frame buffer (e.g., the frame buffer 128 of FIG. 1) after processing video frames according the current frame update rate. In some embodiments, the current frame update rate may be reduced according to a consumption rate that is associated with presenting the content of the frame buffer. In order to correctly process the video frames at the reduced frame update rate, a rate at which a queue (e.g., the queue 126 of FIG. 1) comprising the video frames is accessed is also reduced. In some embodiments, a control module performs the queue access rate reduction as described further below.

The method 400 starts at step 402 and proceeds to step 404, at which the method 400 determines whether the queue is empty. If the method 400 determines that the queue stores zero video frames, the method 400 proceeds to step 406. At step 406, the method 400 sleeps for a predetermined time period. In some embodiments, a thread (e.g., the thread 136 of FIG. 1) associated with the execution of the control module enters sleep mode until a next queue access. If the method 400 determines that there queue is not empty and includes one or more video frames, the method 400 proceeds to step 408.

At step 408, the method 400 selects a queue access rate reduction function. In some embodiments, the control module (e.g., the control module 130 of FIG. 1) performs either queue access rate reduction function. If the queue stores a single video frame, the control module performs step 410 to step 414 as well as step 428 according to one embodiment. On the other hand, the control module performs step 416 to step 428 if the queue stores multiple video frames according to another embodiment.

In some embodiments, the method 400 selects a queue access rate reduction function and proceeds to step 410, at which at least one video frame is processed. At step 412, the method 400 decodes data stored in the at least one video frame. In some embodiments, the control module accesses the single video frame from the queue. In some embodiments, the control module utilizes a decoder (e.g., the decoder 138 of FIG. 1) to decode the data within the single video frame. At step 414, the method 400 updates a frame buffer with the decoded data. At step 428, the method 400 sleeps for a predetermined time period. In some embodiments, after updating the frame buffer, the thread for executing the control module calls a sleep function before another frame buffer update.

For example, if the current frame update rate is to be reduced (i.e., delayed) to ten (10) FPS from fifty (50) FPS, such a reduction translates into an increase in per frame processing time from 0.02 seconds (1/50) to 0.1 seconds (1/10). If step 406 to step 410 are performed in 0.02 seconds, the thread associated with execution of the control module sleeps for the remaining 0.08 seconds before a next queue access for updating the frame buffer. Sleeping for such a period of time reduces CPU utilization without degradation in video quality. The method 400 proceeds to step 430, at which the method 400 ends.

In some embodiments, the method 400 selects another second queue access rate reduction function and proceeds to a step 416, at which the method 400 determines whether the queue includes a key frame amongst multiple video frames. If the method 400 identifies a key frame within the queue, the method 400 proceeds to step 418. At step 418, a most proximate key frame to a current time is identified. Most likely, the most proximate key frame is a most recent key frame amongst the identified key frames within the queue. At step 420, the method 400 removes one or more delta frames preceding the key frame.

Generally, key frames (e.g., Intra-Frames in MPEG or key frames in FLASH) include one or more complete images and identify various positions within the rich Internet content. Delta frames (e.g., P-frames and B-frames) include only a portion of the rich Internet content and require less storage space and/or transmission bandwidth. The delta frames only store differences between frames in front of and/or behind a key frame as small blocks. Frame header information identifies a particular video frames as a key frame or a delta frame.

At step 422, the method 400 processes one or more video frames after a last processed time. Once the preceding delta frames of the identified key frame are removed from the queue, the method 400 processes the identified key frame and one or more succeeding delta frames. At step 424, the method 400 decodes data stored in the key frame and the one or more succeeding delta frames. The method 400 proceeds to step 426, at which the frame buffer is updated with the decoded data. In some embodiments, the control module updates the frame buffer (i.e. the frame buffer 128 of FIG. 1) with contents of the key frame and the one or more succeeding delta frames. The method 400 proceeds to step 428, at which the method 400 sleeps for a predetermined time period. For example, the method 400 sleeps until a next queue access. At step 430, the method 400 ends.

On the other hand, if the queue does not include a key frame, the method 400 proceeds to step 422 after performing step 416. At step 422, the method 400 processes video frames after a last processed time of the queue. In some embodiments, the control module processes each and every video frame having a timestamp after a most recent time at which the queue was accessed. At step 424, data within theses frames are decoded. At step 426, the method 400 updates the frame buffer with the decoded data. In some embodiments, the control module instructs the decoder to decode the data within these frames and store the contents in the frame buffer. The method 400 proceeds to step 428, at which the method 400 sleeps for a predetermined time period. For example, the method 400 sleeps until a next queue access. At step 430, the method 400 ends.

Figure 5:
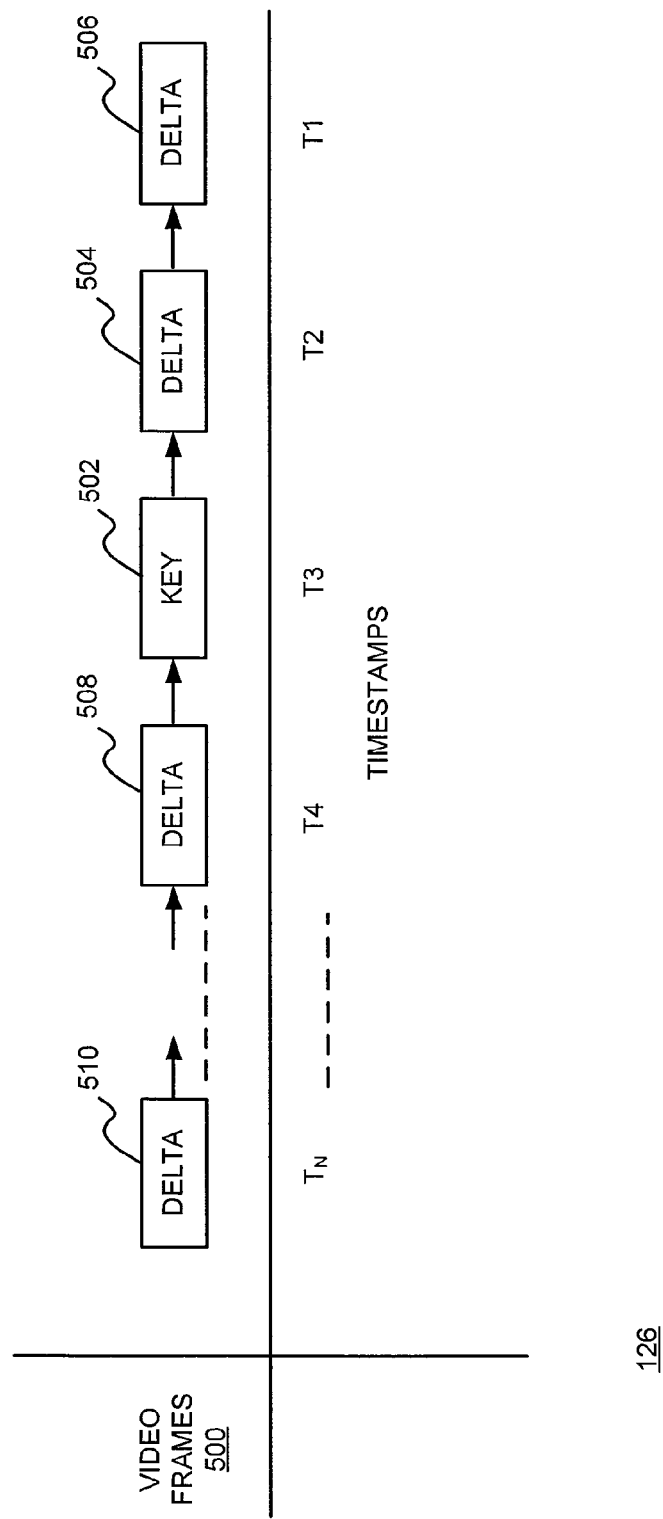
FIG. 5 is a block diagram illustrating processing of a queue comprising video frames, according to one or more embodiments.

FIG. 5 is a block diagram illustrating processing of the queue 126 comprising a plurality of video frames 500, according to one or more embodiments. The plurality of video frames 500 form the rich Internet content 116. As illustrated, the plurality of video frames 500 include a key frame 502, a preceding delta frame 504, a preceding delta frame 506, a succeeding delta frame 508 and a succeeding delta frame 510.

In some embodiments, the key frame 506 is a most proximate key frame to a current time associated with a frame buffer. When the processing of the video frames 500 is delayed, more video frames are available in the queue 126 for updating the frame buffer. A higher number of frames implies a higher likelihood of finding a key frame. In order to display a frame corresponding to a current time, it is enough to start processing from the most proximate key frame (i.e., a last key frame in the queue 126). The frames (e.g., delta frames) preceding the identified key frame can be ignored causing a reduction in a number of video frames to be processed for updating the content of the frame buffer.

Referring to FIG. 5, the queue 500 includes a series of frames having timestamps ranging between a current time ($T_N$) associated with the frame buffer and a last processed time ($T_1$) (i.e., a timestamp associated with a last queue access). In some embodiments, the queue 500 includes a key frame 502, a preceding delta frame 504, a preceding delta frame 506, a succeeding delta frame 508 and a succeeding delta frame 510. In some embodiments, the key frame 502 is a most proximate key frame to the current time ($T_N$). When the processing of the queue 500 is delayed according to the consumption rate (i.e., the consumption rate 134 of FIG. 1), delta frames prior to the key frame 502 timestamp ($T_3$), such as the preceding delta frame 502 and the preceding delta frame 504, can be easily discarded without compromising video quality. Furthermore, the key frame 502, the succeeding delta frame 508 and the succeeding delta frame 510 are processed and used to update the frame buffer. In this manner, unnecessary delta frames are skipped without affecting user experience.

Example Web Server or the Display Device

Figure 6:
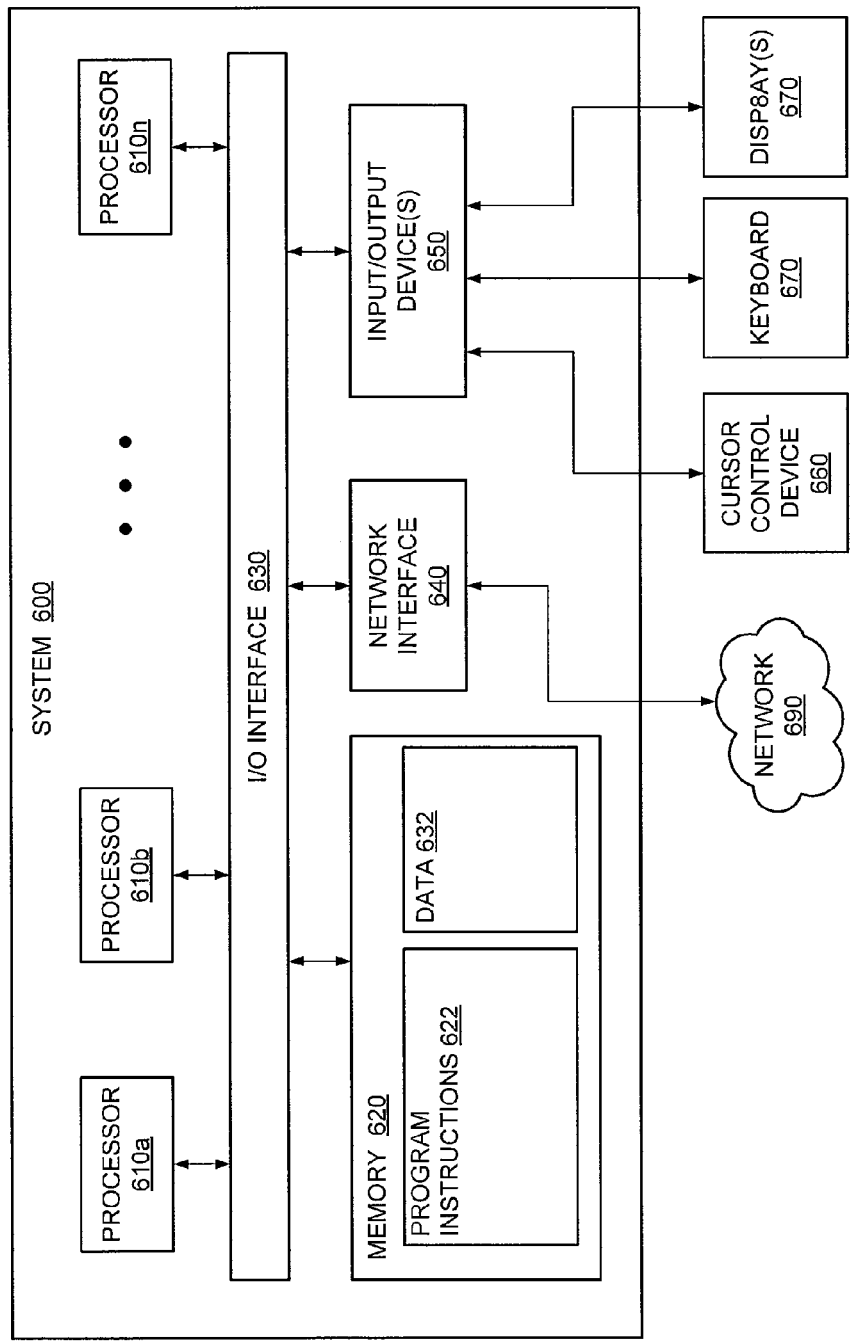
FIG. 6 is a block diagram of a computing system that can be used as a web server, and/or a display device, according to one or more embodiments.

FIG. 6 is a block diagram of a computing system that can be used as a web server, and/or a display device, according to one or more embodiments.

Various embodiments of a system and method for frame buffer rendering of rich Internet content on display devices, as described herein, may be executed on one or more display devices, and the web server which may interact with various other devices. One of such computing system 600 may be one or more display devices, and the web server as illustrated by FIG. 6, which may in various embodiments implement any of the elements or functionality illustrated in FIGS. 1-5. In various embodiments, the system 600 may be configured to frame buffer rendering of rich Internet content on display devices described above. While the illustrated system 600 may be used to implement any other system, device, element, functionality or method of the above-described embodiments. In the illustrated embodiments, system 600 may be configured to implement software as processor-executable executable program instructions 622 (e.g., program instructions executable by processor(s) 610) in various embodiments.

In the illustrated embodiment, the system 600 includes one or more processors 610 coupled to a device memory 620 via an input/output (I/O) interface 630. The system 600 may further includes a network interface 640 coupled to I/O interface 630, and one or more input/output devices 650, such as cursor control device 660, keyboard 670, and display(s) 680. In various embodiments, any of components 660-680 may be utilized by the content display software to receive user input. In various embodiments, a user interface may be generated and displayed on display 680. In some cases, it is contemplated that embodiments may be implemented using a single instance of the system 600, while in other embodiments multiple such devices make up the system 600, may be configured to host different portions or instances of various embodiments. For example, in one embodiment some elements may be implemented via one or more devices of the system 600 that are distinct from those devices implementing other elements. In another example, multiple devices may implement the system 600 in a distributed manner.

In different embodiments, the system 600 may be any of various types of devices where web page customization would be useful, including, but not limited to, a mobile phone, a Personal Digital Assistant (PDA), laptop, notebook, or netbook computer, handheld computer, a camera, a set top box, a consumer device, video game console, handheld video game device, or in general any type of computing or electronic device having a display screen of limited size.

In various embodiments, the system 600 may be a uniprocessor device including one processor 610, or a multiprocessor device including several processors 610 (e.g., two, four, eight, or another suitable number). Processors 610 may be any suitable processor capable of executing instructions. For example, in various embodiments processors 610 may be general-purpose or embedded processors implementing any of a variety of instruction set architectures (ISAs), such as the x96, PowerPC, SPARC, or MIPS ISAs, or any other suitable ISA. In multiprocessor systems, each of processors 610 may commonly, but not necessarily, implement the same ISA.

Device memory 620 may be configured to store program instructions 622 and/or data 632 accessible by processor 610. In various embodiments, device memory 620 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within device memory 620. In other embodiments, program instructions and/or data may be received, sent or stored upon different types of computer-accessible media or on similar media separate from device memory 620 or the system 600.

In one embodiment, I/O interface 630 may be configured to coordinate I/O traffic between processor 610, device memory 620, and any peripheral devices in the device, including network interface 640 or other peripheral interfaces, such as input/output devices 650. In some embodiments, I/O interface 630 may perform any necessary protocol, timing or other data transformations to convert data signals from one components (e.g., device memory 620) into a format suitable for use by another component (e.g., processor 610). In some embodiments, I/O interface 630 may include support for devices attached through various types of peripheral buses, such as a variant of the Peripheral Component Interconnect (PCI) bus standard or the Universal Serial Bus (USB) standard, for example. In some embodiments, the function of I/O interface 630 may be split into two or more separate components, such as a north bridge and a south bridge, for example. Also, in some embodiments some or all of the functionality of I/O interface 630, such as an interface to device memory 620, may be incorporated directly into processor 610.

Network interface 640 may be configured to allow data to be exchanged between the system 600 and other devices attached to a network (e.g., network 690), such as one or more external devices or between the system 600. In various embodiments, network 690 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 640 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 650 may, in some embodiments, include one or more display terminals, keyboards, keypads, touchpads, scanning devices, voice or optical recognition devices, or any other devices suitable for entering or accessing data by one or more the system 600. Multiple input/output devices 650 may be present in the system 600. In some embodiments, similar input/output devices may be separate from the system 600 and may interact with one or more display devices 600 through a wired or wireless connection, such as over network interface 640.

In some embodiments, the illustrated computing system may implement any of the methods described above, such as the methods illustrated by the flowcharts of FIGS. 2-4. In other embodiments, different elements and data may be included.

Those skilled in the art will appreciate that the system 600 is merely illustrative and is not intended to limit the scope of embodiments. In particular, the display device and devices may include any combination of hardware or software that can perform the indicated functions of various embodiments, including computers, network devices, Internet appliances, PDAs, wireless phones, pagers, etc. The system 600 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated display device via intercomputer communication. Some or all of the device components or data structures may also be stored (e.g., as instructions or structured data) on a computer-accessible medium or a portable article to be read by an appropriate drive, various examples of which are described above. In some embodiments, instructions stored on a computer-accessible medium separate from the system 600 may be transmitted to the system 600 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A method of performing frame buffer rendering of rich Internet content on a display device, comprising:
   storing content in a frame buffer according to a frame update rate, wherein the content comprises a portion of the rich Internet content, wherein the rich Internet content is provided interactive functionality as part of a rich Internet application, and wherein the rich Internet content comprises a plurality of key frames and a plurality of delta frames, wherein a key frame includes one or more complete images and identifies various positions within the rich Internet content and wherein a delta frame stores differences between frames preceding and succeeding key frames;
   determining a consumption rate associated with presenting the content of the frame buffer on the display device; and
   reducing the frame update rate when the determined consumption rate is less than the frame update rate, wherein reducing the frame update rate comprises:
      reducing a rate at which a queue comprising a plurality of video frames of rich Internet content is accessed for updating the content of the frame buffer, wherein the queue is partitioned into a plurality of video frames;
      identifying a key frame;
      removing at least one preceding delta frame of the identified key frame; and
      processing the identified key frame and one or more delta frames succeeding the identified key frame.

2. The method of claim 1 further comprising repeating the storing step, the determining step and the adjusting step for each remaining portion of the rich Internet content.

3. The method of claim 1, wherein the adjusted frame update rate equals the consumption rate.

4. The method of claim 1 further comprising:
   decoding data stored within at least one video frame;
   updating the frame buffer with the decoded data; and
   sleeping for a predetermined time period.

5. The method of claim 1, wherein the key frame is a most proximate key frame to a current time associated with the frame buffer.

6. The method of claim 1 further comprising
   decoding data stored within the identified key frame and at least one succeeding delta frame;
   updating the frame buffer with the decoded data; and
   sleeping until a next queue access.

7. The method of claim 1 further comprising:
   decoding data stored within at least one video frame having a timestamp that is prior to a last processed time;
   updating the frame buffer with the decoded data; and
   sleeping until a next queue access.

8. An apparatus for performing frame buffer rendering of rich Internet content comprising:
   a control module for storing content in a frame buffer according to a frame update rate, wherein the frame buffer comprises a portion of the rich Internet content, wherein the rich Internet content is provided interactive functionality as part of a rich Internet application, and wherein the rich Internet content comprises a plurality of key frames and a plurality of delta frames, wherein a key frame includes one or more complete images and identifies various positions within the rich Internet content and wherein a delta frame stores differences between frames preceding and succeeding key frames, determining a consumption rate and reducing the frame update rate when the determined consumption rate is less than the frame update rate, wherein reducing the frame update rate comprises:
      reducing a rate at which a queue comprising a plurality of video frames of rich Internet content is accessed for updating the content of the frame buffer, wherein the queue is partitioned into a plurality of video frames;
      identifying a key frame;
      removing at least one preceding delta frame of the identified key frame; and
      processing the identified key frame and one or more delta frames succeeding the identified key frame.

9. The apparatus of claim 8 further comprising a rich Internet application player comprises a decoder for decoding data within at least one video frame within the frame buffer.

10. The apparatus of claim 9, wherein the control module updates the frame buffer with the decoded data and sleeps for a predetermined time period.

11. A non-transitory computer readable medium for storing processor executable instructions that, when executed by a computing system, causes the computing system to perform a method comprising:
   storing content in a frame buffer according to a frame update rate, wherein the frame buffer comprises a portion of the rich Internet content, wherein the rich Internet content is provided interactive functionality as part of a rich Internet application, and wherein the rich Internet content comprises a plurality of key frames and a plurality of delta frames, wherein a key frame includes one or more complete images and identifies various positions within the rich Internet content and wherein a delta frame stores differences between frames preceding and succeeding key frames;

determining a consumption rate for presenting the content of the frame buffer on the display device; and reducing the frame update rate when the determined consumption rate is less than the frame update rate, wherein reducing the frame update rate comprises:
- reducing a rate at which a queue comprising a plurality of video frames of rich Internet content is accessed for updating the content of the frame buffer, wherein the queue is partitioned into a plurality of video frames;
- identifying a key frame;
- removing at least one preceding delta frame of the identified key frame; and
- processing the identified key frame and one or more delta frames succeeding the identified key frame.

12. The non-transitory computer readable medium of claim 11 further comprises repeating the storing step, the determining step and the adjusting step for each remaining portion of the rich Internet content.

13. The non-transitory computer readable medium of claim 11 further comprising:
- decoding data stored within at least one video frame;
- updating the frame buffer with the decoded data; and
- sleeping for a predetermined time period.

14. The non-transitory computer readable medium of claim 11 wherein identifying the key frame comprises:
- identifying a most proximate key frame to a current time.

15. The non-transitory computer readable medium of claim 11 further comprising:
- decoding data stored within the identified key frame and at least one succeeding delta frames; and
- updating the frame buffer with the decoded data.

* * * * *